United States Patent Office

2,937,164
Patented May 17, 1960

2,937,164

COMPOSITION CONSISTING OF THE REACTION PRODUCT OF A LINEAR SYNTHETIC POLYMER AND A MONOCARBODIIMIDE AND PROCESS FOR CROSSLINKING

Harold P. Brown and Jacob E. Jansen, Akron, and Charles S. Schollenberger, Cuyahoga Falls, Ohio, assignors to The B. F. Goodrich Company, New York, N.Y., a corporation of New York No Drawing. Application November 25, 1957
Serial No. 698,364

14 Claims. (Cl. 260—80.7)

This invention relates to cross-linked polymer compositions and method for their preparation and more specifically pertains to cross-linked products resulting from the reaction between linear organic acid containing polymers and monocarbodiimides and the method of preparing the cross-linked polymers.

The term "monocarbodiimide" as used herein includes compounds having one carbodiimide group corresponding to the general formula R—N=C=N—R' in which R and R' are alkyl, substituted alkyl, alkenyl, aryl, aralkyl, alkaryl and substituted aryl. More specifically the carbodiimides which are useful in this invention are those conforming to the structure R—N=C=N—R' in which R and R' are methyl, ethyl, propyl, butyl, amyl, hexyl, heptyl, octyl, nonyl, decyl, undecyl, dodecyl, cyclopentyl, cyclohexyl, fluoroalkyl said alkyl group containing from 1 to 18 carbon atoms; chloroalkyl said alkyl group containing from 1 to 18 carbon atoms; bromoalkyl said alkyl group containing from 1 to 18 carbon atoms; iodoalkyl said alkyl group containing from 1 to 18 carbon atoms; allyl, methallyl, aralkyl such as benzyl, phenyl ethyl, methyl benzyl, trimethyl benzyl and the corresponding alkyl substituted naphthyl radicals in which said alkyl groups contain an aggregate of from 1 to 18 carbon atoms; alkaryl such as toluyl xylyl, mesityl, methyl naphthyl, and other alkyl substituted phenyl and naphthyl radicals in which the alkyl groups contain an aggregate of from 1 to 18 carbon atoms; and nuclear halogenated aryl groups such as fluorophenyl, chlorophenyl, bromophenyl, iodophenyl and nitrophenyl, cyanophenyl, alkoxyphenyl said alkoxy group containing from 1 to 18 carbon atoms; dialkylaminoaryl said alkyl groups on said amino group containing a total of from 1 to 18 carbon atoms and the aryl group can be phenyl, halogenated phenyl, nitrophenyl, cyanophenyl and alkoxyphenyl, naphthyl, fluoronaphthyl, chloronaphthyl, bromonaphthyl, idononaphthyl, nitronaphthyl, cyanonaphthyl, alkoxynaphthyl said alkoxy group containing from 1 to 18 carbons atoms. The R and R' can be the same or different hydrocarbon or substituted hydrocarbon groups as defined above. The preferred carbodiimides for the purpose of this invention are N,N'-diisopropylcarbodiimide, N,N'-diisobutylcarbodiimide, N,N'-diisoamylcarbodiimide, N,N'-dicyclohexylcarbodiimide, N,N'-diphenylcarbodiimide, N-phenyl, N'-p-chlorophenyl carbodiimide, and N-isoproyl, N'-p-dimethylaminophenyl carbodiimide. The amount of monocarbodiimide useful for the purpose of this invention is from 0.01 to 150 parts by weight of the organic acid containing polymer which is to be cross-linked.

The carbodiimides are easily prepared by a number of methods. In an illustrative example N,N'-dicyclohexylcarbodiimide is prepared when N,N'-dicyclohexylthiourea is refluxed in acetone with an equimolar quantity of yellow mercuric oxide.

The term "organic acid containing polymers" as used herein signifies linear synthetic polymers containing at least 0.005 chemical equivalent by weight of organic acid hydrogen for each 100 parts by weight of polymer said polymers having molecular weights greater than 500 and they can be either liquid or solid at room temperature. The linear organic acid containing polymers useful in this invention can be made by standard emulsion, solution and bulk polymerization techniques. The emulsion recipes used to prepare said interpolymers consist of the mixture of monomers, suitable emulsification and suspension agents, buffering agents for pH control and free radical catalysts of the peroxide such as benzoyl peroxide, hydroperoxide such as di-t-butyl peroxide, diazo such as azobisisobutyronitrile and redox such as persulfate-sulfite types or mixtures of the above catalysts. Polymerization may be carried out in the presence of a free radical catalyst in a closed vessel in an inert atmosphere and under autogeneous pressure or artificially induced pressure or in an open vessel under reflux at atmospheric pressure. The temperatures of the polymerization may be varied from 0° C. or lower to 100° C. or higher, more preferably from 20° C. to 90° C., depending to a large degree upon the activity of the monomers and catalyst used and the molecular weight desired in the polymeric product. The conditions and catalysts used in solution polymerization are similar to those used in the emulsion systems. Polymers made in solution are sometimes soluble end products and in some cases the polymers precipitate from the polymerization medium as they form. Bulk polymerizations are carried out by adding catalyst to the monomer mixture and causing them to polymerize in the absence of a diluent. Because of greater economy, ease of handling and general convenience, the emulsion type of polymerization is preferred. The liquid polymers useful in this invention are prepared by the standard techniques mentioned above with the inclusion of chemical modifiers or chain transfer agents which are exemplified by mercaptans, sulfides, disulfides, bromotrichloromethane, dibromodichloromethane, cumene, and xylene. The technique of making such liquid polymers is known in the art.

The term "organic acid" for the purposes of our invention is defined as a grouping which contains an organic acidic ionizable hydrogen. Examples of functional groups which contain organic acidic ionizable hydrogen are the carboxyl and sulfonic acid groups.

The organic acid containing polymers useful in this invention can be more specifically defined as interpolymers of at least one unsaturated monomer, at least one of which is an alpha-beta olefinically unsaturated organic acid as defined above. Examples of alpha-beta olefinically unsaturated organic acids are acrylic acid, alpha-alkyl substituted acrylic acids said alkyl groups containing from 1 to 6 carbon atoms, alpha-halogenated acrylic acids such as alpha-fluoro, alpha-chloro, alpha-bromo and alpha iodo acrylic acids, alpha-cyano acrylic acid, alpha-phenyl acrylic acid, alpha-(nuclear halogenated phenyl) acrylic acids, maleic acids, alkyl substituted maleic acids said alkyl groups containing 1 to 6 carbon atoms, halomaleic acids, fumaric acid, alkyl substituted fumaric acids said alkyl groups containing 1 to 6 carbon atoms, halofumaric acids, crotonic acid, cinnamic acid, nuclear carboxylated styrenes, nuclear carboxylated alpha-alkyl styrenes said alkyl groups containing 1 to 6 carbon atoms, nuclear sulfonated styrenes, nuclear sulfonated alpha-alkyl styrenes said alkyl groups containing 1 to 6 carbon atoms, ethylene sulfonic acid, beta-sulfonated acrylic acid and alpha-sulfonated acrylic acid.

Other monomers used in the organic acid containing interpolymers useful in this invention are butadiene, 2-alkyl butadienes said alkyl groups containing at least one and not more than six carbon atoms, 2,3-dialkyl butadienes said alkyl groups containing 1 to 6 carbon atoms, 2-halobutadienes, piperylenes, isobutylene, acrylate esters of aliphatic alcohols having 1 to 12 carbon atoms, methacrylate esters of aliphatic alcohols having from 1 to 12 carbon atoms, acrylonitrile, methacrylonitrile, vinylidene cyanide, vinyl halides such as vinyl fluoride, vinyl chloride and vinyl bromide, styrene, alpha-alkyl styrenes said alkyl groups containing 1 to 6 carbon atoms and nuclear alkylated styrenes said alkyl groups containing 1 to 6 carbon atoms.

The preferred polymers for use in this invention are polyacrylic acid, polymethacrylic acid, partially hydrolyzed polyacrylonitrile having at least .005 equivalent of carboxyl hydrogen the interpolymers of acrylate esters and acrylic acid, acrylate esters and methacrylic acid, acrylate esters and methacrylic acid and acrylic acid, butadiene and methacrylic acid, butadiene and acrylic acid, butadiene and styrene and methacrylic acid, butadiene and acrylonitrile and methacrylic acid, chloroprene and acrylic acid, chloroprene and methacrylic acid, butadiene and acrylonitrile and ethylene sulfonic acid, and poly-alpha-sulfonylated acrylic acid. The preferred acrylate and methacrylate esters are the lower alkyl esters or those having an alkyl alcohol moiety having from 1 to about 8 carbon atoms. The proportions of the monomeric ingredients may be varied in any order providing at least .005 chemical equivalent by weight of organic acid hydrogen are incorporated into each 100 grams of polymer having a molecular weight of at least 500.

An object of this invention is the production of novel cross linked polymeric compositions ranging from gel-like masses to tightly cured rubbery products. It is a further object of this invention to provide a means for converting synthetic organic acid containing polymers to these novel gel-like masses and tightly cured rubbery products by treating said organic acid containing polymers with carbodiimides.

The exact mechanism of the cross-linking which takes place in the reaction between the organic acid containing polymers and carbodiimides in this invention is not known.

The cross-linked compositions of this invention vary in physical character from loosely cross-linked gels to tightly cured products depending upon the molecular weight of the original linear organic acid containing polymer used, the proportion of acidic ionizable hydrogen in the polymer, and the proportions of carbodiimide to polymer used in the reaction. When low molecular weight (500–2,000) liquid organic acid containing polymers are used as the starting materials the products of reaction with carbodiimides will vary from loose gels through the "cheesy" stage to rubbery masses depending upon the character of the starting polymer.

The carbodiimides containing secondary or tertiary carbons directly attached to the nitrogens in

R—N=C=N—R′ are the most stable carbodiimides and for this reason the carbodiimides of this type are preferred for use in this invention.

The reactivity of carbodiimides toward organic acid containing polymers is dependent upon the nature of R and R′ in the formula R—N=C=N—R′. When rapid cures are desired the most effective carbodiimides are those in which R and R′ are alkyl. Where slower rates of cure are desired the most effective carbodiimides are those in which R and R′ are aryl. Intermediate cure rates are obtained from the N-alkyl, N′-arylcarbodiimides and physical mixtures of an N,N′-dialkylcarbodiimides and an N,N′-diarylcarbodiimide. Water soluble organic acid containing polymers and dispersions and emulsions of said polymers in water can be cross-linked most readily and efficiently with water soluble carbodiimides. An illustrative example of a water soluble carbodiimide is N,N′-p-dimethylaminophenylcarbodiimide.

The cross-linked compositions embodied in this invention are made by conventional milling and curing techniques when the less reactive carbodiimides are used. Liquid synthetic organic acid containing polymers are compounded and cast in molds and subsequently cured with carbodiimides to produce infusible solid, rubbery and gel-like articles conforming to the shape of the mold.

Solutions of solid organic acid containing polymers and undiluted liquid organic acid containing polymers are coated on surfaces and subsequently treated with carbodiimides to produce cured protective and decorative films. Porous articles including those composed of wood, leather and paper can be impregnated with solutions of solid organic acid containing polymers and undiluted liquid organic acid containing polymers and the resulting products can be cured by treatment of the impregnated article with the desired carbodiimides.

Benzene, toluene, xylene, hexane, methyl ethyl ketone and similar types of organic solvents are thickened by the addition of the proper amount of a carbodiimide to a solution of an organic acid containing polymer in one of said types of solvents. Forms which have been coated with carbodiimides can be dipped into latexes, liquid polymers or a solution of an organic acid containing polymer in an organic solvent in such a manner that a cured film of the polymer conforming to the shape of the form results when the form is withdrawn from the dipping medium. Compounded articles are readily made in this manner. The mixtures of liquid organic acid containing polymers and carbodiimides described herein are useful as caulking compounds, putties, binders for solid fuels, binders for non-woven articles made from cotton fibers, wool fibers, synthetic fibers and asbestos fibers.

When necessary it is possible to control the rate of cure of organic acid containing polymers with carbodiimides by incorporation of small quantities of amines including triethyl amine, triamyl amine, dodecyl amine, hexamethylene diamine and ammonia into the mixture of polymer and carbodiimide. The volatile amines such as triethyl amine and ammonia are particularly advantageous for use in coating, dipping and painting applications because the speed of cure can be controlled by the selection of an amine which vaporizes at the proper rate. Also, the curing rate of normally slow reacting carbodiimides can be accelerated in any of the above processes by heating to a temperature of 50–200° C. the substances that have been treated with the carbodiimide.

The invention as described above is further illustrated by the following examples. The proportions of ingredients are given in parts by weight, unless otherwise specified.

Example I

A liquid butadiene, acrylonitrile, methacrylic acid polymer resulted from the following recipe. The amounts of ingredients are listed as parts per hundred of monomer charged.

| | Parts |
|---|---|
| Butadiene | 55.0 |
| Acrylonitrile | 25.0 |
| Methacrylic acid | 20.0 |
| t-Dodecyl mercaptan | 15.0 |
| $K_2S_2O_8$ | 00.3 |
| Azobisisobutyronitrile | 00.3 |
| Tamol N[1] (sodium salt of naphthalene sulfonic acid condensed with formaldehyde) | 01.0 |
| Nacconol NRSF[1] (sodium alkyl aryl sulfonate) | 03.0 |
| Water | 180.0 |

[1] Commonly available soaps, nonionic, anionic or cationic emulsification agents can be used in place of these.

The pH of the polymerization system was adjusted to 4 by the addition of sulfuric acid. The polymerization was carried out at 40° C. in the absence of oxygen. The emulsion was broken by addition of the latex to an excess of a 15% aqueous solution of calcium chloride and the liquid polymer was isolated. Ten grams of this liquid polymer were placed in a 50 ml. beaker and 0.021 g. of N,N'-dicyclohexylcarbodiimide was added to the flask and mixed into the liquid polymer by rapid stirring. In a minute or two the liquid changed to a stiff, gelled mass. A number of experiments were conducted in this manner and it was found that as little as 0.002 g. of the carbodiimide was sufficient to cause the rapid gelation of this polymer. When N,N'-diphenylcarbodiimide was added to the liquid butadiene, acrylonitrile, methacrylic acid polymer it was necessary to heat the mixture at 50° C. for several hours before gelation occurred.

*Example II*

A liquid polymer composed of 67 parts butadiene, 24.4 parts acrylonitrile and 9.6 parts methacrylic acid was prepared in a manner similar to that described in Example I. Ten grams of this polymer were placed in a 50 ml. beaker and 0.01 g. of N,N'-dicyclohexylcarbodiimide was added to the rapidly stirred liquid. The liquid solidified in one to one and a half minutes at room temperature after the addition of the carbodiimide.

*Example III*

A 20% toluene solution of the polymer described in Example I was gelled at room temperature with the addition of the same proportion of N,N'-dicyclohexylcarbodiimide in five to six minutes after the addition. This demonstrates that the rate of cross-linking can be altered by dilution.

A liquid butadiene, acrylonitrile polymer made in the manner described in Example I from a monomer charge of 67 parts butadiene and 33 parts acrylonitrile showed no cure when mixed with various proportions of N,N'-dicyclohexylcarbodiimide on prolonged standing at room temperature. This example demonstrates the necessity for organic acidic hydrogen in the polymer in order to effect cure with carbodiimides.

*Example IV*

Four grams of a liquid copolymer of 90 parts butadiene, 10 parts methacrylic acid made in the manner described in Example I was placed in a small glass vial equipped with screw cap. Twelve drops of N,N'-dicyclohexylcarbodiimide were added to the vial, the vial was securely capped and the contents were shaken rapidly. The viscosity of the mixture increased immediately and continued to increase until in 15 minutes a stiff, grainy, non-pourable paste resulted.

*Example V*

A liquid butyl acrylate, methacrylic acid, acrylic acid polymer was prepared in the manner described in Example I from a monomer charge of 89 parts of butyl acrylate, 5.5 parts of methacrylic acid and 5.5 parts of acrylic acid. This polymer was dissolved in toluene in sufficient amount to yield a 40% solution. This solution was gelled in less than 15 seconds with the addition of the theoretical amount of N,N'-dicyclohexylcarbodiimide. (This is one half mole of the carbodiimide for every mole of acidic hydrogen present in the polymer.) The polymer cured in this manner at room temperature was allowed to dry and the stiff, horny product remained unchanged after soaking for three days in water at room temperature. A butyl acrylate, maleic anhydride copolymer in which part of the anhydride groups had been converted to carboxyl groups by hydrolysis behaved in a manner similar to that of the butyl acrylate, methacrylic acid polymer of this example.

*Example VI*

A 50% toluene solution of the liquid butadiene, acrylonitrile, methacrylic acid polymer described in Example II was treated with the theoretical equivalent of N,N'-diisopropyl carbodiimide. Twenty grams of the polymer solution were treated with 0.007 g. of N,N'-diisopropylcarbodiimide at room temperature and a solid gel formed in 15 seconds. The gelation started instantaneously in the area where the carbodiimide drops entered the polymer solution. The gel which resulted was dried at 50° C. until all the toluene had been removed. The product was unchanged upon standing in water at room temperature for three days.

*Example VII*

A gel free butadiene, styrene, methacrylic acid rubber prepared in a recipe similar to that described in Example I with about 0.8 part of the modifier (t-dodecylmercaptan) which was charged 71.5 parts butadiene, 22 parts styrene and 6.5 parts methacrylic acid was pressed into a sheet ³⁄₃₂" thick at 300° F. for one hour. This same butadiene, styrene, methacrylic acid polymer was compounded with 50% carbon black and a black sheet was pressed at 300° F. for one hour. The thickness of the black sheet was ⁵⁄₁₆".

The gum sheet was painted with several coats of a 25% solution of N,N'-dicyclohexylcarbodiimide in toluene at approximately 30 minute intervals. A tight cure developed on the surface of the sheet immediately upon the first application of the carbodiimide solution. The depth of the final cure, measured by opacity and tenacity was approximately ²⁄₆₄" thick. The black sheet was treated in the same manner and a tight final cure extended to a depth of ³⁄₆₄" from the surface and the surface of this sheet was wrinkled more than that of the cured gum sheet. Additional painting of said rubber sheets with said carbodiimide solution resulted in sheets which were cured throughout their masses.

*Example VIII*

An irregular shaped piece of a butadiene, acrylonitrile, methacrylic acid rubber made from a charge of 67 parts butadiene, 24.4 parts acrylonitrile and 9.6 parts methacrylic acid was immersed in a 1% toluene solution of N,N'-dicyclohexylcarbodiimide for 8 hours. The rubber was dried at 50° C. A cured outer shell ³⁄₃₂" thick was observed.

*Example IX*

Ten grams of a butadiene, styrene, methacrylic acid polymer described in Example VII in crumb form were immersed in a 1% toluene solution of N,N'-dicyclohexylcarbodiimide for 8 hours. The crumbs were dried at 50° C. The smaller crumbs were cured throughout and the larger crumbs had uncured centers.

*Example X*

A 50% toluene cement of the low molecular weight butyl acrylate, methacrylic acid, acrylic acid polymer described in Example V was prepared for coating glass and aluminum in the following experiments.

(A) A glass plate was coated with the cement and allowed to dry at room temperature. The coating remained tacky and unchanged upon prolonged room temperature aging.

(B) A glass plate was coated with the carboxylic polymer cement. The air dried film was painted with a 25% solution of N,N'-dicyclohexylcarbodiimide in toluene. The surface of the film lost its tackiness and became opaque in 28 seconds. The film was not sensitive to water at this stage.

(C) A film of the carboxylic polymer on glass was painted with a 25% solution of N,N'-dicyclohexylcarbodiimide in chloroform. The surface of the film became opaque and non-tacky in one minute.

(D) The carboxylic rubber cement was painted on a sheet of aluminum and allowed to air dry. The dried film remained tacky upon prolonged standing at room temperature.

(E) The dried carboxylic rubber film on an aluminum sheet was painted with the 25% solution of N,N'-dicyclohexylcarbodiimide in toluene. The surface of the film became dry and non-tacky in one minute.

(F) As in E the film was painted with a 25% solution of N,N'-dicyclohexylcarbodiimide in chloroform and in less than one minute the surface of the film had lost its tackiness and became opaque.

*Example XI*

Five grams of the butadiene, methacrylic acid copolymer described in Example IV were dissolved in 95 g. of gasoline at 50° C. The addition of a few drops of N,N'-dicyclohexylcarbodiimide to this solution produced gelation in one hour at room temperature.

*Example XII*

A solution of the butyl acrylate, methacrylic acid, acrylic acid polymer described in Example V in methyl ethyl ketone was treated with a solution of N,N'-didodecylcarbodiimide in tetrahydrofuran. Gelation started in 10 seconds and a dry vulcanized mass resulted in two minutes.

*Example XIII*

An emulsion chloroprene, methacrylic acid copolymer containing 0.03 equivalent per hundred of carboxyl and having a cryoscopic molecular weight of 2872 was made up into a 20% solution in benzene. An equivalent amount of N,N'-dicyclohexylcarbodiimide was added to the solution. In 24 hours at room temperature a mixture of gel and liquid was observed. In 3 days at room temperature the mixture had set up to a solid mass.

*Example XIV*

A 20% toluene solution of a chloroprene, methacrylic acid copolymer having 0.06 equivalent per hundred of carboxyl and a molecular weight of 3126 was treated with an equivalent amount of N,N'-dicyclohexylcarbodiimide and the mixture was allowed to stand at room temperature for 3 days. In 24 hours a mixture of gel and liquid was observed. In 3 days the mixture was a solid gel.

*Example XV*

(A) A leather disc was impregnated with a 50% toluene solution of the butadiene, acrylonitrile, methacrylic acid polymer described in Example II. The treatment was at room temperature and the disc was then dried to constant weight.

(B) A leather disc was impregnated with a liquid butadiene, acrylonitrile, methacrylic acid described in Example II at 250° F. The product was dried to constant weight.

Each of the dried impregnated discs was dipped three times at one hour intervals in a 50% solution of N,N'-dicyclohexylcarbodiimide and the product was dried to constant weight.

|  | A, g. | B, g. |
| --- | --- | --- |
| Wt. of impregnated disc | 7.9131 | 7.8313 |
| Wt. of carbodiimide treated disc | 8.5311 | 8.2906 |
| Wt. increase | 0.6180 | 0.4593 |

The products were slightly less flexible and non-tacky. The air permeability of the discs was decreased significantly by this treatment.

Impregnated leather articles of this type are useful for shoes, gaskets, diaphragms and the like.

*Example XVI*

A butadiene, acrylonitrile, ethylene sulfonic acid polymer made in emulsion and charged 67 parts butadiene, 22.2 parts acrylonitrile and 10.8 parts of ethylene sulfonic acid was found by analysis to contain 4.65% S and 5.7% N. This corresponds to a composition of 62.2% butadiene, 21.6% acrylonitrile and 16.2% ethylene sulfonic acid. Ten ml. of a 20% solution of this polymer in methyl ethyl ketone was treated with two drops of N,N'-dicyclohexylcarbodiimide. The mass solidified in less than one minute at room temperature.

*Example XVII*

A liquid homopolymer of alpha-sulfonyl acrylic acid was treated with a few drops of a 1% solution of N,N'-dicyclohexylcarbodiimide in toluene. The originally sticky syrup was converted to a white solid in a few minutes at room temperature. The white solid product was insoluble in toluene. This procedure can be used for converting porous materials into products which are impermeable to liquid hydrocarbon.

*Example XVIII*

(A) The butadiene, styrene, methacrylic acid rubber described in Example VII was compounded on the mill with 50 parts EPC carbon black and 7 parts N,N'-dicyclohexylcarbodiimide. The compounded stock was cured at 300° F. for 15 minutes.

(B) The butadiene, styrene, methacrylic acid rubber described in A of this example was compounded with 50 parts EPC carbon black on the mill. The compounded stock was put through a cure cycle of 15 minutes at 300° F. The physical properties of cured rubbers A and B are tabulated below.

|  | Tensile (p.s.i.) | Elongation, percent |
| --- | --- | --- |
| A | 2,580 | 265 |
| B | 450 | 1,150 |

The above data shows that N,N'-dicyclohexylcarbodiimide is an effective vulcanization agent for organic acid containing rubbers.

*Example XIX*

Samples of a rubber composed of 67 parts butadiene, 26.6 parts acrylonitrile and 6.4 parts methacrylic acid were compounded with (A) 50 parts EPC carbon black and 4.3 parts N,N'-diisopropylcarbodiimide and a control B which was the same as A without the carbodiimide. Samples A and B were given a cure cycle of 15 minutes at 310° F. The physical properties of the cured samples are as follows:

|  | 300% Modulus, p.s.i. | Tensile, p.s.i. | Elongation |
| --- | --- | --- | --- |
| A | 1,100 | 2,280 | 435 |
| B | None | 500 | 1,200 |

The above data show that a monocarbodiimide, N,N'-diisopropylcarbodiimide is an effective vulcanization agent for the above type of organic acid containing rubber.

It is to be understood that other carboxyl and sulfonic acid containing polymers having at least 0.005 equivalents of acidic hydrogen and a molecular weight of at least 500 can be substituted for the polymeric reactants and that the other carbodiimides conforming to the generic formula R—N=C=N—R' can be substituted on a molar basis for the carbodiimides disclosed in these specific examples.

The above description and examples are intended to be illustrative only. Any modification of or variation therefrom which conforms to the spirit of this invention is intended to be included within the scope of the claims.

What is claimed is:

1. The composition consisting of the reaction product of (1) a linear synthetic polymer selected from the group consisting of polyacrylic acid, polymethacrylic acid, partially hydrolyzed polyacrylonitrile, an interpolymer of an acrylate ester and acrylic acid, an acrylate ester and methacrylic acid, an acrylate ester and acrylic acid and methacrylic acid the alcohol moieties of said acrylate esters having from 1 to 12 carbon atoms, an interpolymer of butadiene and methacrylic acid, butadiene and acrylic acid, butadiene and styrene and methacrylic acid, butadiene and acrylonitrile and methacrylic acid, chloroprene and acrylic acid, chloroprene and methacrylic acid, butadiene and acrylonitrile and ethylene sulfonic acid, and poly alpha-sulfonated acrylic acid, said polymer containing at least 0.005 chemical equivalent by weight of organic acid hydrogen for each 100 parts by weight of polymer said polymer having a molecular weight greater than 500 and (2) a monocarbodiimide selected from the group consisting of N,N'-diisopropylcarbodiimide, N,N'-diisobutylcarbodiimide, N,N'-diisoamylcarbodiimide, N,N'-dicyclohexylcarbodiimide, N,N'-diphenylcarbodiimide, N-phenyl, N'-p-chlorophenylcarbodiimide, and N-isopropyl, N'-p-dimethylaminophenylcarbodiimide.

2. The composition consisting of the reaction product of (1) a linear synthetic polymer selected from the group consisting of polyacrylic acid, polymethacrylic acid, partially hydrolyzed polyacrylonitrile, an interpolymer of an acrylate ester and acrylic acid, an acrylate ester and methacrylic acid, an acrylate ester and acrylic acid and methacrylic acid, the alcohol moieties of said acrylate esters having from 1 to 12 carbon atoms, an interpolymer of butadiene and methacrylic acid, butadiene and styrene and methacrylic acid, butadiene and acrylonitrile and methacrylic acid, chloroprene and acrylic acid, chloroprene and methacrylic acid, butadiene and acrylonitrile and ethylene sulfonic acid, and poly alpha-sulfonated acrylic acid said polymer containing at least 0.005 chemical equivalent by weight of organic acid hydrogen for each 100 parts by weight of polymer said polymer having a molecular weight greater than 500 and (2) a monocarbodiimide conforming to the structure R—N=C=N—R' wherein R and R' are hydrocarbon groups having from 1 to 18 carbon atoms.

3. The composition consisting of the reaction product of (1) a linear synthetic polymer selected from the group consisting of polyacrylic acid, polymethacrylic acid, partially hydrolyzed polyacrylonitrile, an interpolymer of an acrylate ester and acrylic acid, an acrylate ester and methacrylic acid, an acrylate ester and acrylic acid and methacrylic acid, the alcohol moieties of said acrylate esters having from 1 to 12 carbon atoms, an interpolymer of butadiene and methacrylic acid, butadiene and styrene and methacrylic acid, butadiene and acrylonitrile and methacrylic acid, chloroprene and acrylic acid, chloroprene and methacrylic acid, butadiene and acrylonitrile and ethylene sulfonic acid, and poly alpha-sulfonated acrylic acid said polymer containing at least 0.005 chemical equivalent by weight of organic acid hydrogen for each 100 parts by weight of polymer said polymer having a molecular weight greater than 500 and (2) a monocarbodiimide conforming to the structure R—N=C=N—R' wherein R and R' are aliphatic hydrocarbon groups having from 1 to 18 carbon atoms.

4. The composition of claim 3 wherein the monocarbodiimide is N,N'-diisopropyl carbodiimide.

5. The composition of claim 3 wherein the monocarbodiimide is N,N'-dodecyl carbodiimide.

6. The composition of claim 2 wherein the monocarbodiimide is N,N'-dicyclohexyl carbodiimide.

7. The composition of claim 2 wherein the monocarbodiimide is N,N'-diphenyl carbodiimide.

8. A reaction product of an interpolymer of butadiene, acrylonitrile and an alpha-beta-ethylenically unsaturated organic acid and N,N'-diisopropylcarbodiimide.

9. A reaction product of an interpolymer of butadiene, styrene and methacrylic acid and N,N'-dicyclohexylcarbodiimide.

10. A reaction product of an interpolymer of a lower alkyl acrylate and at least one alpha-beta-ethylenically unsaturated organic acid and N,N'-didodecylcarbodiimide.

11. A reaction product of an interpolymer of butadiene, and methacrylic acid and N,N'-dicyclohexylcarbodiimide.

12. A reaction product of an interpolymer of chloroprene and methacrylic acid and N,N'-dicyclohexylcarbodiimide.

13. A process for cross-linking a linear synthetic polymer selected from the group consisting of polyacrylic acid, polymethacrylic acid, partially hydrolyzed polyacrylonitrile, an interpolymer of an acrylate ester and acrylic acid, an acrylate ester and methacrylic acid, an acrylate ester and acrylic acid and methacrylic acid, the alcohol moieties of said acrylate esters having from 1 to 12 carbon atoms, an interpolymer of butadiene and methacrylic acid, butadiene and styrene and methacrylic acid, butadiene and acrylonitrile and methacrylic acid, chloroprene and acrylic acid, chloroprene and methacrylic acid, butadiene and acrylonitrile and ethylene sulfonic acid, and poly alpha-sulfonated acrylic acid said polymer containing at least 0.005 chemical equivalent by weight of organic acid hydrogen for each 100 parts by weight of polymer said polymer having a molecular weight greater than 500 said method consisting of reacting said polymer with a monocarbodiimide conforming to the structure $$R-N=C=N-R'$$

wherein R and R' are hydrocarbon groups having from 1 to 18 carbon atoms at a temperature below 200° C.

14. A process for cross-linking a linear synthetic polymer selected from the group consisting of polyacrylic acid, polymethacrylic acid, partially hydrolyzed polyacrylonitrile, an interpolymer of an acrylate ester and acrylic acid, an acrylate ester and methacrylic acid, an acrylate ester and acrylic acid and methacrylic acid, the alcohol moieties of said acrylate esters having from 1 to 12 carbon atoms, an interpolymer of butadiene and methacrylic acid, butadiene and styrene and methacrylic acid, butadiene and acrylonitrile and methacrylic acid, chloroprene and acrylic acid, chloroprene and methacrylic acid, butadiene and acrylonitrile and ethylene sulfonic acid, and poly alpha-sulfonated acrylic acid said polymer containing at least 0.005 chemical equivalent by weight of organic acid hydrogen for each 100 parts by weight of polymer said polymer having a molecular weight greater than 500 said process consisting of reacting said polymer with a monocarbodiimide selected from the group consisting of N,N'-diisopropylcarbodiimide, N,N'-diisobutylcarbodiimide, N,N'-diisoamylcarbodiimide, N,N'-dicyclohexylcarbodiimide, N,N'-diphenylcarbodiimide, N-phenyl, N'-p-chlorophenylcarbodiimide, and N-isopropyl, N'-p-dimethylaminophenylcarbodiimide at a temperature below 200° C. in an organic solvent selected from the class consisting of benzene, toluene, xylene, hexane and methyl ethyl ketone.

References Cited in the file of this patent

UNITED STATES PATENTS 2,654,680    Goppel et al. _____ Oct. 6, 1953